(12) United States Patent
Jablonski et al.

(10) Patent No.: US 9,517,441 B2
(45) Date of Patent: Dec. 13, 2016

(54) BEVERAGE DISPENSING SYSTEMS AND METHODS OF DISPENSING BEVERAGES FROM BEVERAGE DISPENSING SYSTEMS

(71) Applicant: Cornelius, Inc., St. Paul, MN (US)

(72) Inventors: Thaddeus M. Jablonski, Palatine, IL (US); Richard Schultz, Niles, IL (US); David K. Njaastad, Palatine, IL (US)

(73) Assignee: Cornelius, Inc., St. Paul, MN (US)

( * ) Notice: Subject to any disclaimer, the term of this patent is extended or adjusted under 35 U.S.C. 154(b) by 79 days.

(21) Appl. No.: 14/636,942

(22) Filed: Mar. 3, 2015

(65) Prior Publication Data

US 2016/0114301 A1   Apr. 28, 2016

Related U.S. Application Data

(60) Provisional application No. 62/069,020, filed on Oct. 27, 2014.

(51) Int. Cl.
| | |
|---|---|
| *B01F 15/04* | (2006.01) |
| *B01F 15/00* | (2006.01) |
| *A23L 2/00* | (2006.01) |
| *G05D 11/02* | (2006.01) |
| *G05D 11/13* | (2006.01) |
| *A23L 2/52* | (2006.01) |
| *B67D 1/12* | (2006.01) |

(52) U.S. Cl.
CPC .............. *B01F 15/0429* (2013.01); *A23L 2/00* (2013.01); *B01F 15/00194* (2013.01); *B01F 15/00422* (2013.01); *B01F 15/0408* (2013.01); *B01F 15/0425* (2013.01); *B67D 1/12* (2013.01); *G05D 11/02* (2013.01); *G05D 11/134* (2013.01); *B01F 15/00233* (2013.01); *B01F 2215/0022* (2013.01)

(58) Field of Classification Search
CPC .............. B01F 15/0425; B01F 15/0429; B01F 15/00422; B01F 2215/0022; B01F 15/0408; B01F 15/00194; B01F 15/00233; B67D 1/1227; B67D 3/0003; B67D 3/0041; G07F 13/04; B65B 1/32; B65B 3/28; G05D 11/02; A23L 2/00
USPC ........................................................ 366/141
See application file for complete search history.

(56) References Cited

U.S. PATENT DOCUMENTS

| | | | |
|---|---|---|---|
| 4,590,975 A | 5/1986 | Credle, Jr. | |
| 4,641,692 A * | 2/1987 | Bennett ................. | A47J 31/402 141/198 |
| 4,798,232 A * | 1/1989 | Stembridge ........... | B06B 1/0681 141/1 |

(Continued)

FOREIGN PATENT DOCUMENTS

| | | |
|---|---|---|
| AU | 728683 | 10/1998 |
| CN | 101446833 | 6/2009 |
| GB | 2184853 | 7/1987 |

*Primary Examiner* — Tony G Soohoo
(74) *Attorney, Agent, or Firm* — Andrus Intellectual Property Law, LLP

(57) ABSTRACT

Systems and methods of beverage dispensing include a dispensing unit, at least one diluent source, and at least one flavoring source. An amount of beverage product to dispense is calculated and a beverage product including at least one diluent and at least one flavoring is dispensed. An actual diluent-to-flavoring ratio is calculated based upon at least one value from the sensing unit during the dispense of the beverage product.

12 Claims, 9 Drawing Sheets

(56) References Cited

U.S. PATENT DOCUMENTS

| | | | | |
|---|---|---|---|---|
| 4,817,689 A * | 4/1989 | Stembridge | B06B 1/0681 | 141/198 |
| 4,883,100 A * | 11/1989 | Stembridge | B06B 1/0681 | 141/1 |
| 4,890,651 A * | 1/1990 | Stembridge | B06B 1/0681 | 141/1 |
| 4,917,155 A | 4/1990 | Koblasz et al. | | |
| 4,944,335 A * | 7/1990 | Stembridge | B06B 1/0681 | 141/1 |
| 4,944,336 A * | 7/1990 | Stembridge | B06B 1/0681 | 141/1 |
| 4,949,526 A | 8/1990 | Brogna et al. | | |
| 4,961,456 A * | 10/1990 | Stembridge | B06B 1/0681 | 141/1 |
| 5,036,892 A * | 8/1991 | Stembridge | B06B 1/0681 | 141/1 |
| 5,072,853 A * | 12/1991 | Shannon | B67D 1/0036 | 222/1 |
| 5,255,819 A * | 10/1993 | Peckels | B67D 3/0041 | 222/1 |
| 6,102,246 A | 8/2000 | Goulet et al. | | |
| 6,194,013 B1 | 2/2001 | Kolar et al. | | |
| 6,227,265 B1 * | 5/2001 | Skell | B67D 1/1236 | 141/198 |
| 6,409,046 B1 * | 6/2002 | Peckels | B67D 3/0041 | 222/1 |
| 6,446,680 B1 * | 9/2002 | Soehnlen | A23C 9/1516 | 141/100 |
| 7,750,817 B2 * | 7/2010 | Teller | B67D 3/0077 | 222/55 |
| 8,245,735 B2 | 8/2012 | Chase et al. | | |
| 8,376,193 B2 | 2/2013 | Veltrop et al. | | |
| 8,534,497 B2 | 9/2013 | Veltrop et al. | | |
| 8,606,396 B2 | 12/2013 | Claesson et al. | | |
| 8,616,248 B2 | 12/2013 | Herbert | | |
| 8,616,250 B2 | 12/2013 | Herbert | | |
| 8,721,162 B2 | 5/2014 | Claesson et al. | | |
| 9,026,245 B2 * | 5/2015 | Tilton | G07F 13/065 | 700/233 |
| 9,174,834 B2 * | 11/2015 | Veltrop | B67D 3/0019 | |
| 2006/0134598 A1 | 6/2006 | Kenny | | |
| 2006/0238346 A1 * | 10/2006 | Teller | B67D 3/0077 | 340/572.1 |
| 2009/0069932 A1 * | 3/2009 | Rudick | B67D 1/0888 | 700/239 |
| 2009/0183796 A1 | 7/2009 | Chase et al. | | |
| 2010/0318225 A1 | 12/2010 | Claesson et al. | | |
| 2011/0168290 A1 | 7/2011 | Breitenbach et al. | | |
| 2011/0189358 A1 | 8/2011 | Herbert | | |
| 2012/0104023 A1 | 5/2012 | Anselmino et al. | | |
| 2012/0164285 A1 * | 6/2012 | Doglioni Major | A47J 31/3609 | 426/231 |
| 2012/0223096 A1 | 9/2012 | Rudick | | |
| 2013/0001249 A1 * | 1/2013 | Wiemer | B67D 1/0021 | 222/25 |
| 2013/0220480 A1 | 8/2013 | Agnus et al. | | |
| 2013/0240559 A1 | 9/2013 | Rudick | | |
| 2014/0212566 A1 | 7/2014 | Herbert et al. | | |
| 2014/0361035 A1 | 12/2014 | Rudick | | |
| 2015/0314246 A1 * | 11/2015 | Lehtonen | B01F 13/0818 | 700/265 |
| 2016/0114301 A1 * | 4/2016 | Jablonski | B67D 1/12 | 426/231 |

* cited by examiner

BEVERAGE DISPENSING SYSTEMS AND METHODS OF DISPENSING BEVERAGES FROM BEVERAGE DISPENSING SYSTEMS

CROSS-REFERENCE TO RELATED APPLICATION

The present application claims priority of U.S. Provisional Patent Application No. 62/069,020, filed on Oct. 27, 2014, the content of which is hereby incorporated herein by reference in its entirety.

FIELD

The present disclosure relates to beverage dispensing systems and methods of dispensing beverages having a mixture of a diluent such as water and one or more flavorings such as a syrup.

BACKGROUND

U.S. Pat. No. 7,750,817 discloses systems and methods for monitoring the dispensing of a beverage from a dispensing apparatus into a container using a scale and other devices. Methods may perform the following steps: measuring a scale time for the container on a scale, measuring an end weight for the container on the scale, and determining that a dispense event has occurred for the beverage based on whether a tilt condition of a dispensing apparatus occurred substantially within the scale time and based on whether the end weight of the beverage dispensed into the container approximates a serving based on point-of-sale information. In some embodiments the tilt condition is measured by a sensor device that does not contact the beverage being dispensed. Further embodiments may use pour time and the weight of the dispensing apparatus. The determined dispense event may determine the brand of the beverage dispensed.

U.S. Patent Application Publication No. 2013/0220480 discloses an automated beverage dispenser for dispensing a beverage and ice into a cup. The automated beverage dispenser includes an ice dispending station with an ice auger and a weight sensor, a beverage dispensing station, and a control device. The control device instructs the ice auger to fill the cup with a predetermined amount of ice and instructs the beverage dispensing station to fill the cup with a predetermined amount of beverage in response to a weight of the cup as determined by the weight sensor.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, beverage dispensing systems are provided for dispensing a beverage into a container. The systems can comprise a source of a diluent, such as water; a source of a flavoring, such as a syrup; a dispenser nozzle that is configured to dispense to the container a beverage comprising a mixture of the diluent and the flavoring in an actual diluent-to-flavoring ratio; a sensing unit that is configured to sense characteristics of the container, any ice in the container, and the beverage in the container; and a controller that is configured to calculate the actual diluent-to-flavoring ratio based upon the weight characteristics. Methods of operating the beverage dispenser are also disclosed herein.

Exemplary embodiments of a beverage dispensing system are configured to dispense a beverage product into a container. A diluent source includes a diluent. A flavoring source includes a flavoring. A dispenser nozzle is configured to dispense into the container a beverage product that includes a mixture of the diluent and the flavoring in an actual diluent-to-flavoring ratio. A sensing unit is configured to measure a load impressed upon the sensing unit by the container, any ice in the container, and any beverage product in the container. A controller receives a value representative of the load measured by the sensing unit and calculates the actual diluent-to-flavoring ratio based upon the load.

An exemplary embodiment of a method of dispensing a beverage product from a beverage dispenser includes receiving an order of a beverage product at a controller of the beverage dispenser. The beverage dispenser includes at least one diluent source and at least one flavoring source. An amount of ice in a container is sensed with a sensing unit. An amount of beverage product to dispense to fill the container is calculated. The beverage product includes at least a diluent from the at least one diluent source and a flavoring from the at least one flavoring source. The calculated amount of beverage product is dispensed from the at least one diluent source and the at least one flavoring source. The computer calculates a quality of the dispensed beverage product by calculating an actual diluent-to-flavoring ratio. The computer compares the actual diluent-to-flavoring ratio to a predetermined optimal diluent-to-flavoring ratio for the beverage product. An indication of the comparison is produced on a graphical display of the beverage dispenser.

BRIEF DESCRIPTION OF THE DRAWINGS

Examples are described with reference to the following drawing figures. The same numbers are used throughout the figures to reference like features and components.

DETAILED DESCRIPTION OF THE DRAWINGS

Figure 1:
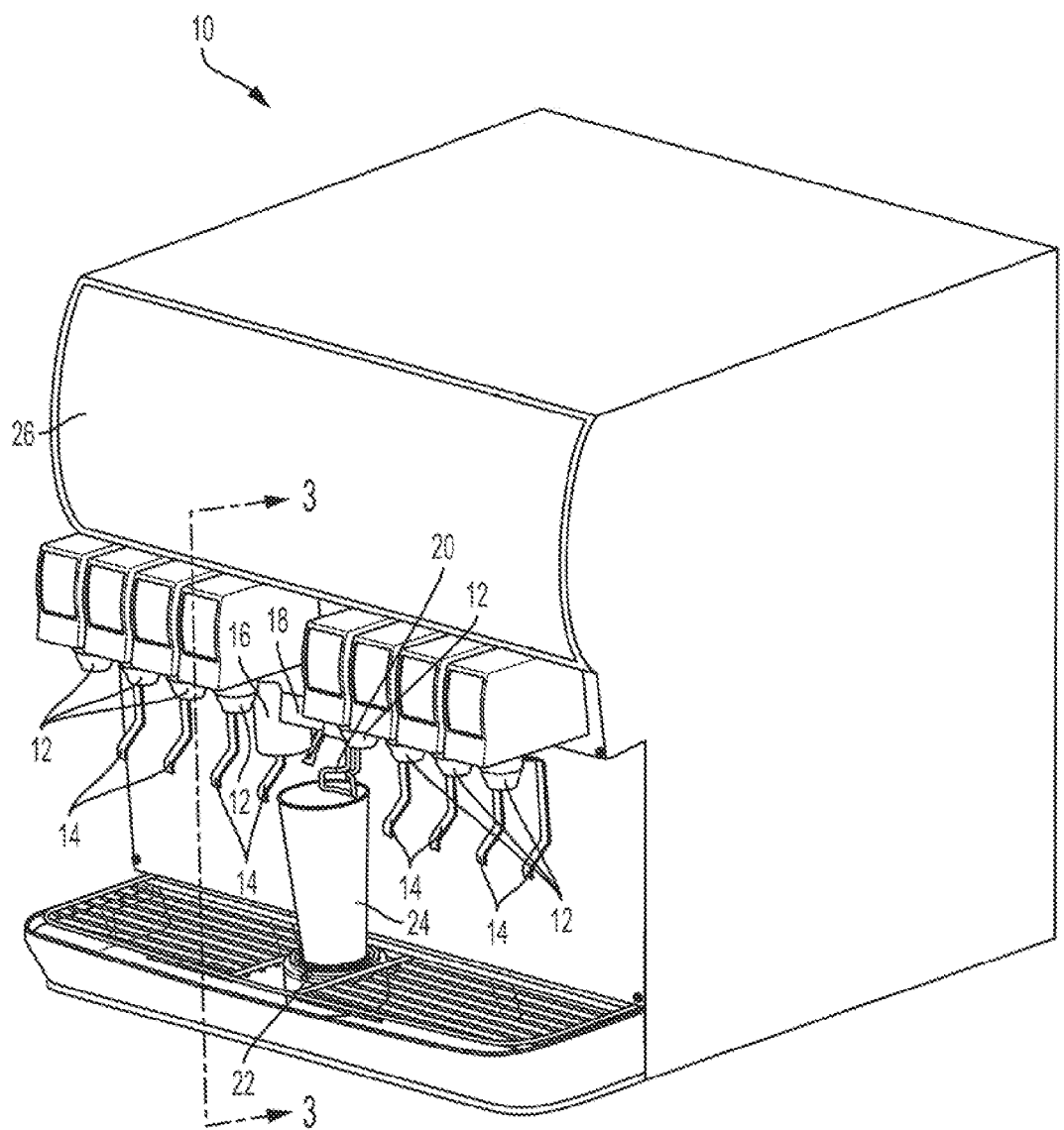
FIG. 1 is a front perspective view of an exemplary embodiment of a beverage dispensing system.

The present inventors have endeavored to produce quality beverages including soft drinks by continuously monitoring or adjusting beverage ratio; to accurately, reliably and repeatably measure and dispense a beverage portion; and to produce an accurate and repeatable portion control for beverages.

In certain, non-limiting examples, the present disclosure relates to a "drop in" style ice beverage unit adapted with sensing unit, including load cell, technology applied to a target zone designated for a multi-flavor nozzle.

In one exemplary embodiment, a beverage dispenser with a sensing unit, including, but not limited to a load cell can be used to manually calibrate the water and beverage flow-rates from the beverage dispenser. Diluent (e.g. water or carbonated water) information is then stored in the computer while the beverage information is used to determine the amount of beverage required by each drink size. In an embodiment an assumption can be made that the diluent and flavoring (e.g. syrup) flow-rates remain constant with time and/or may drift slowly with time. Given this flow-rate assumption the unit can then calculate and monitor beverage ratio and exemplarily present an alarm should the ratio go out of specification.

In another exemplary embodiment, a beverage dispenser, in addition to the features described above, includes at least one flow-meter, which may be a turbine type flow meter, in one or more diluent circuits of the unit. Calibration between the at least one sensing unit and the at least one flow-meter enables real time calculation of the beverage ratio. In some embodiments as disclosed herein, this may improve an accuracy of the system.

In a still further embodiment, a beverage dispenser, in addition to the features described above include the further feature of an ability to monitor and adjust diluent and flavoring flow-rates in real time. In a non-limiting embodiment, pulse width modulation may be applied to the diluent and flavoring valve modules to adjust the flavoring and/or diluent flow-rate(s).

In still further embodiments disclosed herein, information about flow rates can be used to monitor consumption of diluent and flavoring and control the inventory of various brands or types of diluent and/or flavoring.

The present disclosure provides a beverage dispenser which includes a device that is configured to measure a weight of a liquid poured into a container (e.g. a cup). The measurement values are used to automatically or automatedly assist a technician or in an autofill operation by the beverage dispenser. In an exemplary embodiment of a post-mix soda dispenser, it is desirable to achieve a predetermined ratio of flavoring to diluent correct. Branded and/or custom beverages may have a predetermined diluent-to-flavoring ratio. Beverage product quality and inventory control require that the beverage dispenser achieve this predetermined diluent-to-flavoring ratio. This is typically performed as a manual task referred to as "brixing" which is performed with a measuring cup and a timed pour for each of the individual ingredients dispensed by the beverage dispenser to make the beverage.

FIG. 1 is a front perspective view of an exemplary embodiment of a beverage dispensing system 10. The beverage dispensing system 10 may exemplarily be a post-mix beverage dispensing system for dispensing carbonated beverages such as colas, flavored soda and like soft drinks in which one or more concentrated flavoring (e.g. syrup) is mixed with a diluent (e.g. water and/or carbonated water) at the point of dispense.

While the beverage dispensing system 10 is depicted with a plurality of beverage nozzles 12, each exemplarily associated with a single dispensed beverage and operated by a force-actuated lever 14, the beverage dispensing system 10 further includes a multi-beverage nozzle 16. The multi-beverage nozzle 16 is operable to dispense a combination of any of a variety of diluents and flavors, as may be selected by a user out of the single multi-beverage nozzle to dispense a beverage selected by a user. In exemplary embodiments, the beverage dispensing system 10 may further include an ice dispenser 18. The ice dispenser 18 may be operated upon detecting a cup at a location below the dispenser 18. In an alternative embodiment, the ice dispenser 18 may be manually actionable, exemplarily by way of ice dispenser lever 20.

Exemplary embodiments of the beverage dispensing system 10 include a sensing unit 22, as will be described in further detail herein. In an exemplary embodiment, the sensing unit 22 is mounted to a frame (not depicted) of the beverage dispensing system and is located directly under a nozzle of the beverage dispensing system 10, exemplarily, the multi-beverage spout 16. It will be recognized that embodiments as disclosed herein may be implemented with one or more multi-beverage nozzles, one or more single beverage nozzles, or a combination thereof. A sample vessel 24 is placed on the sensing unit 22. In embodiments, the sample vessel is a beverage cup, and further is exemplarily any one of a plurality of beverage cups available for the dispense of beverage to consumer by the beverage dispensing system 10. In some exemplary embodiments, the beverage dispensing system 10 may see advantages in that the diluent-to-flavoring ratios for one or more beverages may be controlled without the use of a dedicated "brixing cup" as typically used in the industry.

The beverage dispensing system 10 further exemplarily includes a graphical display 26. The graphical display 26 may exemplary be an LED display, OLED display or other form of graphical display technology. Still further embodiments of the graphical display 26 may be touch-sensitive graphical displays, embodying a graphical user interface capable of presenting information as disclosed herein to a user, including a technician or a customer, and receiving inputs or controls from a technician or customer as described in further detail herein.

Figure 2:
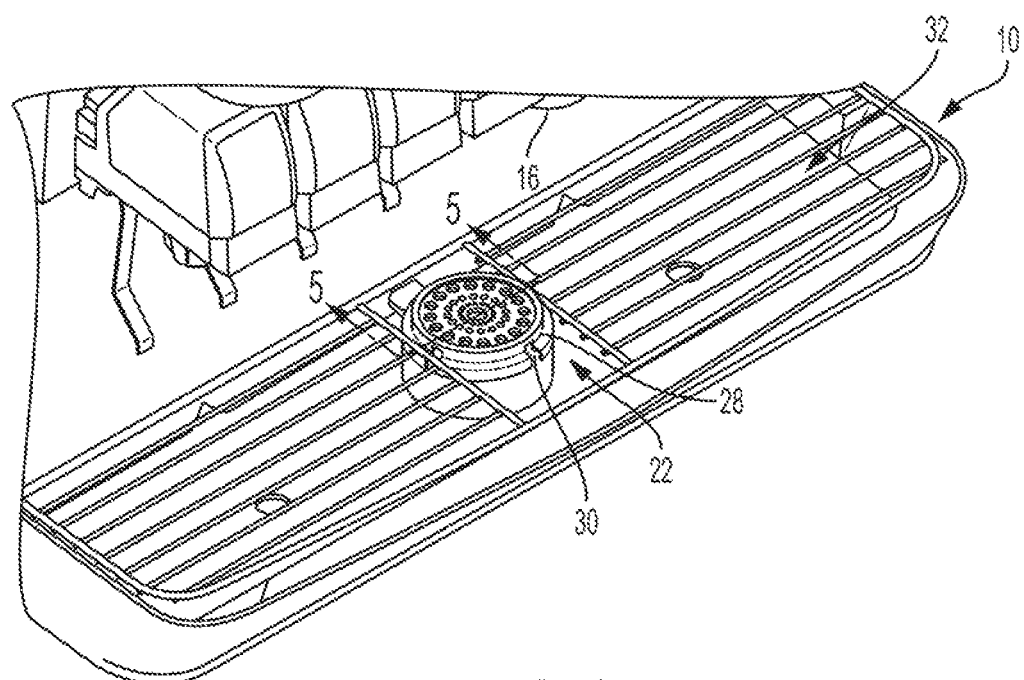
FIG. 2 is a top perspective close up view of a portion of the beverage dispensing system, showing an exemplary embodiment of a sensing unit.

FIG. 2 is a top perspective close up of an exemplary embodiment of the beverage dispensing system 10 better depicting the sensing unit 22, which will be described in further detail herein. In an exemplary embodiment, the sensing unit 22 is a scale, load cell, or other device measuring a force impressed upon the sensing unit 22. The sensing unit 22 is exemplarily located directly below a multi-beverage nozzle 16. In an embodiment, the sensing unit 22 includes a cup rest 28, exemplarily configured with a series of concentric holes to keep liquid from splashing if a cup is not present and venting features 30 for draining any excess liquids away from the sensing unit 22 and into the spill tray 32.

Figure 3:
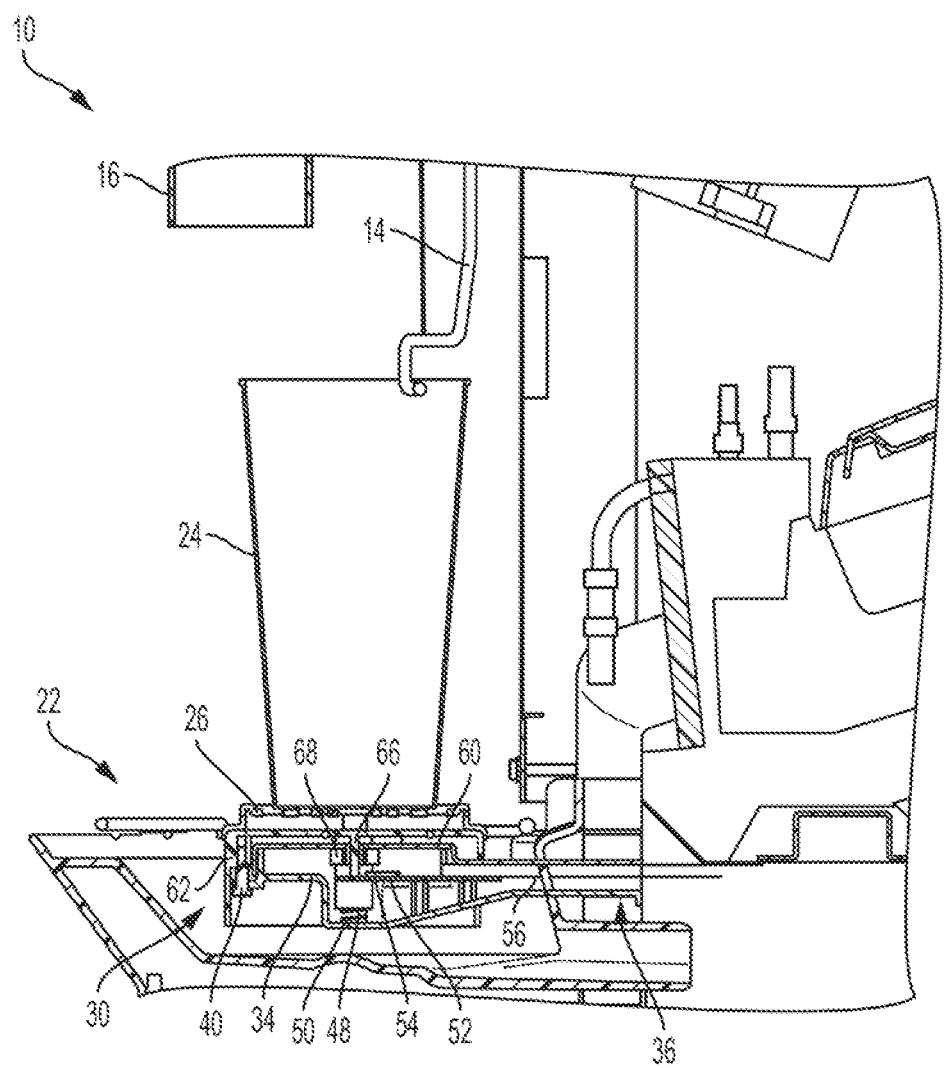
FIG. 3 is a side sectional view of a beverage dispensing system.
Figure 4:
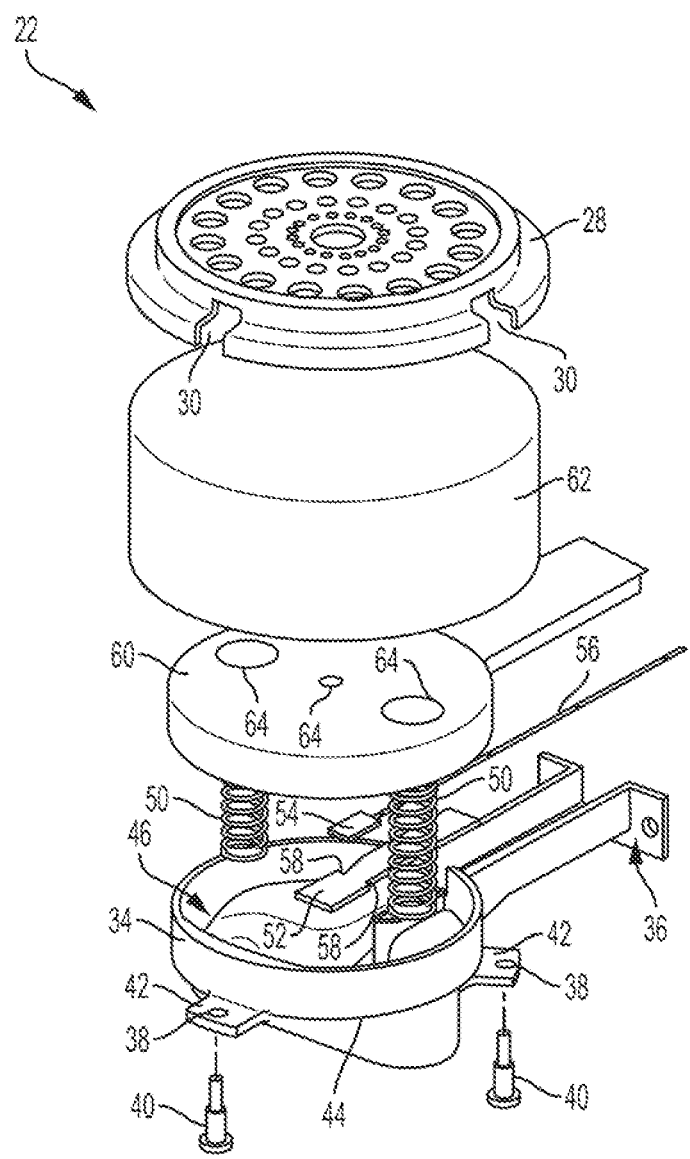
FIG. 4 is an exploded view of an exemplary embodiment of a sensing unit.
Figure 5:
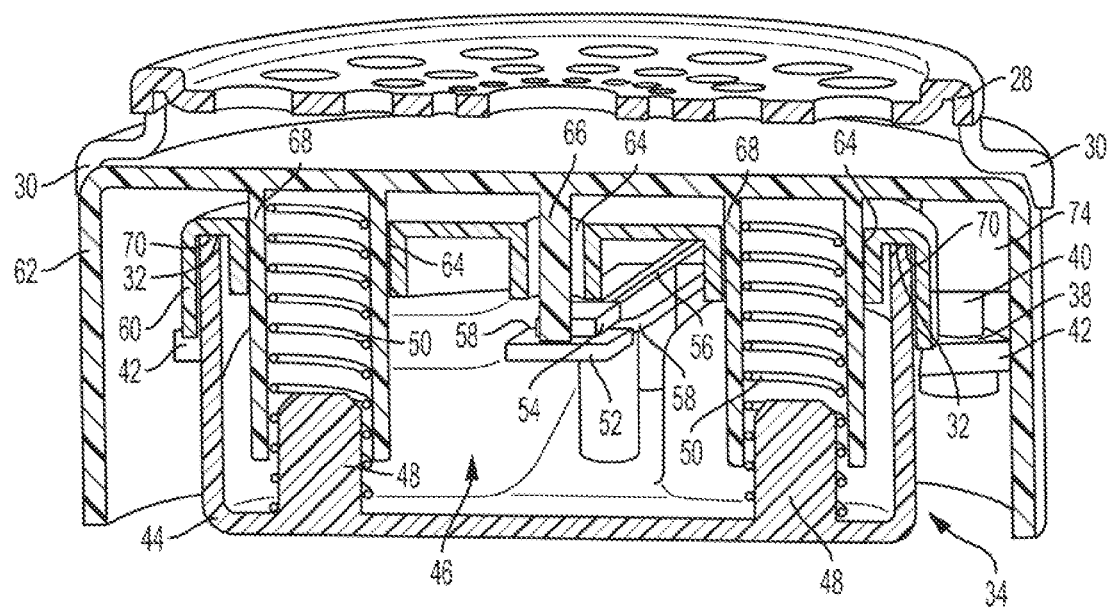
FIG. 5 is a detailed sectional view of an embodiment of a sensing unit, taken along line 5-5 of FIG. 2.

FIG. 3 is a cross-sectional view exemplarily taken along line 3-3 of FIG. 1 which depicts an exemplary embodiment of the sensing unit 22 and at least a portion of the beverage dispensing system 10 in cross section. FIG. 4 is an exploded view of an exemplary embodiment of the sensing unit 22, while FIG. 5 is a cross-sectional view of an exemplary embodiment of the sensing unit 22 as taken along line 5-5 of FIG. 2. The sensing unit 22 will be described in further detail herein with respect to FIGS. 3-5.

The sensing unit 22 includes a sensor housing 34 which exemplarily provides structure to the sensing unit 22 and includes a mount 36 that attaches the sensing unit 22 to the rest of the beverage dispensing system 10. The mount 36, may exemplarily be screws or rivets, while other embodiments include, but are not limited to interlocking components and friction fits which may be used as well.

The sensor housing 34 further includes through holes 38 exemplarily configured to receive guide screw 40 as will be described in further detail herein. In an exemplary embodiment, the through holes 38 are located in support tabs 42 that extend away from a body 44 of the sensor housing 34. The interior 46 of the body 44 of the sensor housing 34 may further include at least one projection 48 extending from the body 44 into the interior 46. The at least one projection 48, and as exemplarily depicted in FIG. 5, two projections 48, are configured to receive at least one spring 50 as described in further detail herein. The sensor housing 34 further includes a strain gauge plate 52 which extends into the interior 46 of the sensor housing 34. A strain gauge 54 is located on the strain gauge plate 52 in a manner such that the strain gauge 54 can sense deflections in the strain gauge plate 52, exemplarily caused by forces applied to the sensing unit 22, exemplarily due to weight of a vessel and any ice and beverage dispensed into the vessel and located on the cup rest 28. At least one lead wire 56 extends away from the strain gauge 54 to a computer or other processing system as described in further detail herein. In an exemplary embodiment, the strain gauge 54 is configured to measure a weight impressed upon the sensing unit 22. In an exemplary embodiment of the sensing unit 22, the strain gauge plate 52 further includes at least one notch 58 in the strain gauge plate 52 in an area proximal to the strain gauge 54. The at least one notch 58 through the strain gauge plate 52 may facilitate proper deflection by the strain gauge plate 52 for detection by the strain gauge 54, exemplarily across a range of sensitivity of the strain gauge 54.

As previously noted, an exemplary embodiment of the sensing unit 22 includes at least one spring 50. The at least one spring 50 extends between the projection 48 of the sensor housing 34 exemplarily through a cover housing 60 and engages a product cover 62. The cover housing 60 and product cover 62 exemplarily cooperate to protect the interior 46 of the sensor housing 34 from encroaching liquids. In the exemplary embodiment depicted, the cover housing 60 includes three holes 64 configured to receive features there through. One hole 64 exemplarily receives a post 66 that extends downward from the product cover 62 to impart a force from the cup rest 28 on the product cover 62 to the strain gauge 54 by applying the force to the strain gauge plate 52. The other holes 64 through the cover housing 60 further exemplarily receive the spring 50 and spring housing 66 which surrounding the springs 50 and depend downwardly from an interior of the product cover 62. The spring 50, product cover 62, and sensor housing 34 interact to control an amount of deflection applied to the strain gauge 54 and strain gauge plate 52 by the product cover 62 and post 66, exemplarily to protect the sensing unit 22 from over loading. In an exemplary embodiment, an engagement of a bottom of the spring housing 68 with the body 44 of the sensor housing 34 defines a bottom range of motion for the product cover 62 and a maximum force applied to the strain gauge plate 52.

In an exemplary embodiment, the cover housing 60 is secured to the sensor housing 34 by engagement of structural features, exemplarily by a lip 70 which engages a top edge 72 of the sensor housing 34. In an exemplary embodiment, the lip 70 may extend over an exterior of the sensor housing 34 and rest upon or engage the support tabs 42. The product cover 62 is secured about the sensor housing 34 by the guide screws 40 threadingly engaging the product cover 62, exemplarily at integrated nuts 74. Tuning and proper securement of the guide screws 40 secure the product cover 62 to the sensor housing 34 and ensure that any downward deflection of the product cover 62 is done so in a uniform manner, without cocking of the product cover 62.

Figure 6:
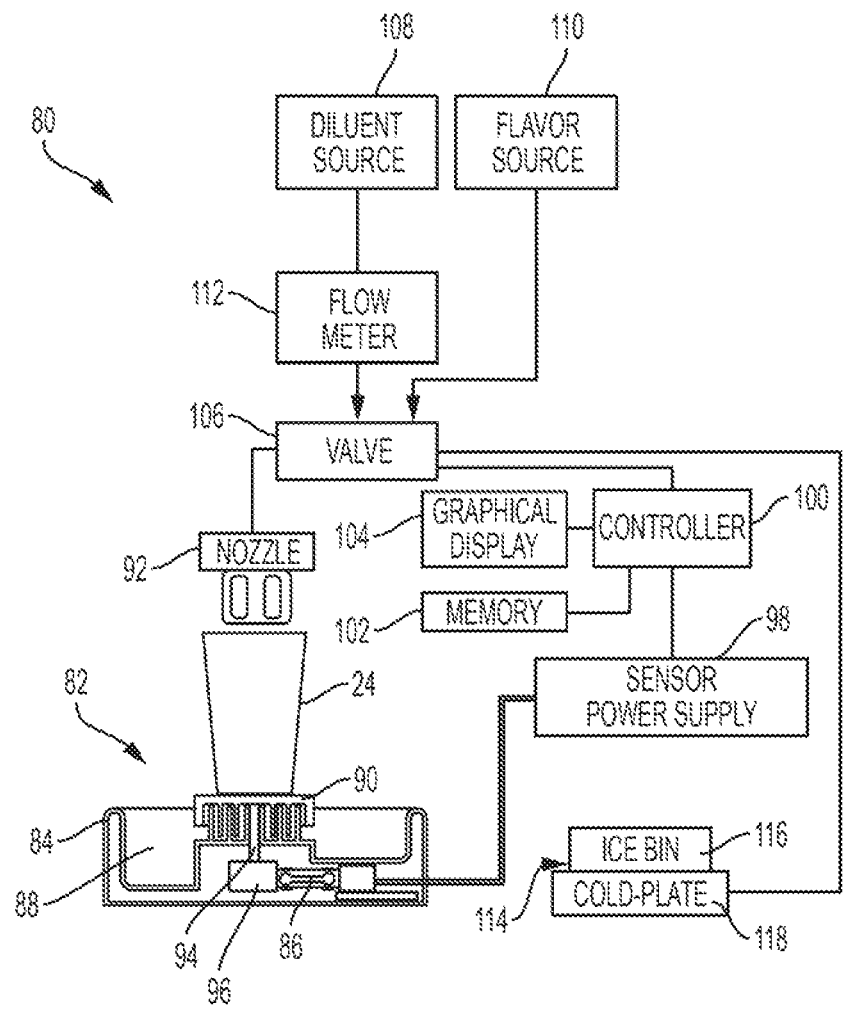
FIG. 6 is a schematic view of an exemplary embodiment of a beverage dispensing system.

FIG. 6 is a schematic view of an exemplary embodiment of a beverage dispensing system 80. The exemplary embodiment of the beverage dispensing system 80 depicted in FIG. 6 is presented in a schematic form to highlight components not previously highlighted with respect to the description of the system as depicted in FIGS. 1-5. It will recognized by a person of ordinary skill in the art that various embodiments may include a combination of features as depicted and described with respect to any of these embodiments.

The beverage dispensing system 80 includes a sensing unit 82. Embodiments of the sensing unit 82 may operate as described above previously, although the embodiment of the sensing unit 82, as depicted in FIG. 6, includes a rubber diaphragm 84 that surrounds at least a portion of the sensing unit 82 to create a fluid impervious barrier, exemplarily surrounding the strain gauge 86 and/or other electronics of the sensing unit 82.

The rubber diaphragm 84 may further be formed to create a drip tray 88 that directs any spilled beverage away from the rest of the sensing unit 82. The sensing unit 82 may include a product cover 90, exemplarily as described above, upon which a sample vessel 24 (e.g. a cup) may be positioned underneath a nozzle 92 of the beverage dispensing system 80. The product cover 90 may further include a post 94 as described above which translates a force impressed upon the product cover 90 exemplarily by the sample vessel 24 and any ice and beverage located therein upon a strain gauge plate 96 to which the strain gauge 86 is secured.

In an exemplary embodiment, the strain gauge 86 is a full bridge load cell although, it will be understood that in other embodiments, various other types of strain gauges, load cells, or other sensors may be used. The strain gauge 86 is exemplarily electrically connected to a sensor power supply 98. In an exemplary embodiment, the sensor power supply 98 is a Wheatstone bridge power supply.

The strain gauge 86 is either directly or indirectly connected to a controller 100, exemplarily through the sensor power supply 98. The controller 100 may include, but is not limited to a computer, processor, or programmable logic configured and operated as disclosed herein. The controller 100 operates to measure the values from the strain gauge 86 and to process those vales in a manner such as to determine the force impressed upon the sensing unit 82. As will be described in further detail herein, the controller 100 accesses computer readable code exemplarily stored on a non-transient computer readable medium embodying computer memory 102 wherefrom the controller 100 can execute the software stored therein in order to perform calculations and carry out functions as described in further detail herein with respect to the beverage dispensing system 80.

In exemplary embodiments, the controller 100 is communicatively connected to a graphical display 104. The graphical display 104 is exemplarily operated in a manner as described above with respect to the graphical display 26 depicted in FIG. 1 to present information to a user or operator. In embodiments, wherein the graphical display 104 is a touch-sensitive graphical display, the graphical display 104 may also operate as a user input device capable of receiving touch or multi-touch user inputs or gesture inputs.

The beverage dispensing system 80 may further include a valve 106 which may exemplarily be a multifunction valve capable of receiving and controlling the flow of one or more beverage components. The valve 106 may be connected to at least one diluent source 108 and at least on flavor source 110. It will be recognized that non-limiting examples of the diluent in the diluent source 108 may include water and carbonated water. It will be recognized that non-limiting examples of the flavor in the flavor source 110 may be syrups. The syrup in the flavor source 110 may exemplary be branded syrups that when combined with a diluent form a branded beverage, while other syrups may be generic flavors. The flavor source 110 may also include other forms of flavors or additives that may be combined with at least one diluent in making a post-mix beverage.

Exemplary embodiments disclosed in further detail herein, further include a flow meter 112 connected in association with the at least one diluent source 108. In exemplary embodiments, the flow meter 112 may exemplarily be a turbine flow meter, paddle flow meter, Venturi flow meter, or other types of flow meters as would be recognized by a person of ordinary skill in the art. The flow meter 112 exemplarily measures as actual flow rate of the at least one diluent dispensed by the beverage dispenser 80. It will be noted that in at least some embodiments, no flow meter is used in connection or association with the at least one flavor source 110. In the development of the beverage dispensing system as disclosed herein, it was discovered that use of such flow meters with flavoring such as syrup are susceptible to inaccuracies, clogging, and may be difficult to clean and maintain in a clean state. Therefore, in embodiments as disclosed herein, the inventors sought to achieve solutions whereby diluent-to-flavoring ratios for dispensed beverages may be calculated and monitored without a need for a flow meter associated with the flavor source 110.

The at least one valve 106 may be fluidly connected to the nozzle 92 of the beverage dispensing system 80 such that one or more diluents and/or flavors are dispensed through the valve 106 and the nozzle 92 in a manner such as to create a beverage in the vessel 24. In embodiments, the valve 106 may operate to control the amount and flow rate of diluents and/or flavors therethrough. In one exemplary embodiment, the valve is a pulse width modulated (PWM) valve such that pulse width modulated control signals from the controller 100 control opening and closing of the valve 106 in the manner as disclosed herein.

The valve 106 may further be connected to an ice dispenser 114. In exemplary embodiments, the ice dispenser 114 includes an ice bin 116 which stores the ice for dispense and a cold plate 118 that maintains the ice in the ice bin 116 at a desired temperature. In other embodiments, the ice dispenser 114 may be connected directly to the nozzle 92, or in still further embodiments a separate dispensing port directed at the vessel 24 may be used to dispense ice from the ice dispenser 114.

Figure 7:
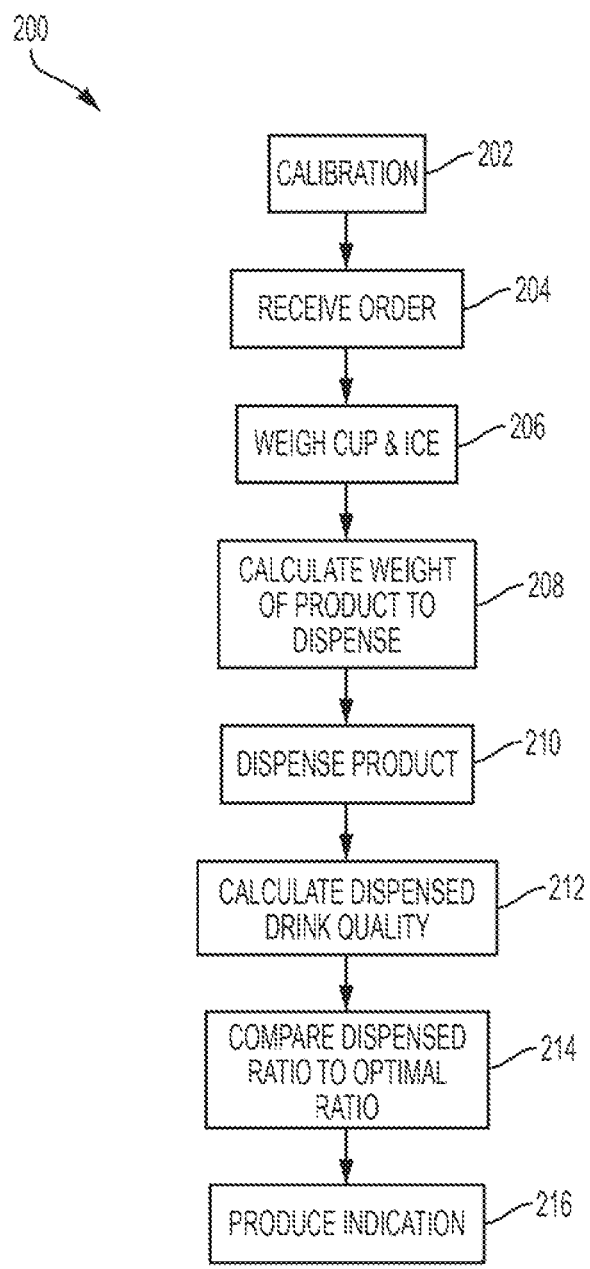
FIG. 7 is a flow chart that depicts an exemplary embodiment of a method of dispensing a beverage.

FIG. 7 is a flow chart that depicts an exemplary embodiment of a method of dispensing a beverage 200. In exemplary embodiments, the method of dispensing a beverage 200 is a method of dispending a post-mix beverage that includes the combination of at least one diluent and at least one flavoring to form the beverage.

At 202 the beverage dispensing system is calibrated. In an exemplary embodiment as described in further detail herein with respect to FIG. 8, the calibration at 202, may be part of an automatic or automated brixing procedure whereby dispensed beverage is measured and, if necessary, any of the dispensing controls are adjusted in order to achieve a desired diluent-to-flavoring ratio. In other embodiments, calibration at 202 may include one or more of obtaining a beverage volume for each of a plurality of available cup sizes for selection by a user. In embodiments the beverage volume may include the total volume of ice, diluent, and flavoring. Embodiments of the calibration at 202 may also include obtaining a specific gravity of each diluent, flavoring, and ice as used in the beverage dispensing system. Still further embodiments of calibration at 202 include obtaining a flow rate of the available diluents, which may exemplary include water and carbonated water.

At 204, a beverage order is received. Exemplarily, the beverage order may include a cup size and a beverage product. In an exemplary embodiment, the order is received by the beverage dispensing system, by a either single input or a sequence of inputs by a user. In an embodiment, the beverage dispensing system receives the entire beverage order (e.g. cup size and beverage product) at one time. It will be recognized that in alternative embodiments, the order may be received by the beverage dispensing system at 204 in a two part process whereby a cup size is received at one time and a beverage input is received at another time prior to dispense of the beverage. Although both operations are contemplated within the scope of the present disclosure.

Next, at 206, the appropriately sized cup relative to the received order is selected and filled with ice. In an exemplary embodiment, this may be performed automatedly by a beverage dispensing unit, while in alternative embodiments this may be performed manually by a operator or user. In either event, the selected cup containing ice is placed on the sensing unit of the beverage dispenser and the cup and ice is weighed by the sensing unit. In one exemplary embodiment, the weight of the combined cup and ice is provided to the computer which uses a predetermined value for a empty cup weight as well as a density of the ice used to calculate the volume of ice in the cup. In an exemplary embodiment, an assumption that the cup itself is a negligible weight may be made, in other embodiments, a cup weight associated with the selected cut size is stored as a value, and the measured weight adjusted to compensate for the cup weight.

Next, at 208 a weight of product to dispense is calculated. In one non-limiting embodiment, the weight of the product to dispense calculated at 208 is first calculated by the volume of the drink as ordered from which the volume of the ice in the cup is subtracted. In an exemplary embodiment, the software executed by the computer calculates the volume of the ice according to the equation:

$$Vi = mc/Di$$

where Vi is the volume of ice and mc is the weight of the cup and the ice and Di is the density of the ice.

In a still further embodiment, the software executed by the controller may verify that the calculated ice volume is within an appropriate range. This may be performed by a comparison to a threshold maximum ice volume. If the calculated volume exceeds this maximum ice volume, the beverage dispensing unit may turn to an error mode. Otherwise, the beverage dispenser may continue to dispense the beverage. The weight of the product to dispense is further calculated at 208. Exemplarily, the software executed by the computer calculates a volume of beverage product required to fill the remaining volume in the cup. The remaining volume in the cup may be calculated with the equation:

$$Vp = Vc - Vi$$

wherein Vp is the volume of product and Vc is the volume of the cup.

A predetermined diluent-to-flavoring ratio (R) may be stored at the controller, in the software, or at computer memory accessible by the controller. Such predetermined ratio may be determined by the producer of the beverage in the case of a branded beverage or may be determined by an operator in the case of a custom or proprietary beverage. From this ratio, the controller executing the software can calculate the diluent volume required for the dispenser exemplarily with the equation:

$$Vwp=Vp*[(R/(R+1)]$$

wherein Vwp is the volume of diluent dispensed and R is the diluent-to-flavoring ratio.

Next, the weight of the diluent to be dispensed for the ordered beverage is calculated by the equation:

$$mwp=Vwp*Dw$$

wherein mwp is the weight of the poured water and Dw is the density of the water.

The processor operates in a similar manner to calculate a weight of the flavoring (e.g. syrup) to be dispensed by first calculating the volume of flavoring required for the beverage using the equation:

$$Vsp=Vp*[(1/(R+1)]$$

wherein Vsp is the volume of flavoring needed for the dispenses beverage.

This volume is converted to a weight using the equation:

$$msp=Vsp*Ds$$

wherein msp is the weight of the syrup and Ds is the density of the syrup.

It may be recognized that in certain embodiments, and dependent upon the recipe for the ordered beverage, more than one flavoring may be used and therefore a weight for multiple syrups or other additives may need to be calculated. Finally, the controller executes software to calculate the total weight of the beverage product to dispense by calculating a summation of the weight components sensed by the sensing unit. Exemplarily, this may be calculated using the equation: mp=mwp+msp+mc wherein mp is the final weight impressed upon the sensing unit after dispense of the ordered product.

At 210 the beverage is dispensed by the beverage dispenser into the cup filled with ice and located on the sensing unit, of the beverage dispenser. In an exemplary embodiment, the nozzle of the beverage dispenser operates to receive both the diluent and flavoring as exemplarily controlled by one or more flow valves operated by the controller of the beverage dispenser. The controller of the beverage dispenser operates the one or more flow valves to dispense constituent flows of the at least one diluent and flavoring in accordance with a recipe of the ordered beverage and the diluent-to-flavoring ratio for the ordered beverage. In an exemplary embodiment, the constituent components of the beverage are dispensed until the sensing unit detects the calculated total weight of product to dispense. In embodiments, the beverage dispensing system further measures and stores a dispense time (tp). In further exemplary embodiments, the beverage dispenser uses the load impressed upon the sensing unit in a feedback loop in order to determine when to end the dispense of the product. In some exemplary embodiments of the beverage dispenser that include a flow meter in association with the diluent source, the flow rate of the diluent may further be monitored and recorded by the controller of the beverage dispenser. An average flow rate and/or instantaneous flow rate of the diluent during the dispense may be calculated by the controller in such an embodiment.

Next, at 212 a quality of the dispensed drink is calculated. In an exemplary embodiment, the dispensed drink quality is evaluated upon a basis of the accuracy by which the diluent-to-flavoring ratio for the beverage product was achieved. In such an embodiment, the beverage dispenser, and the computer of the beverage dispenser executing the software recalculates the fraction volume of the components of the beverage product. This may exemplarily be performed by the controller calculating a volume of diluent dispensed into the cup using the equation:

$$Vwc=Fw*tp$$

wherein Vwc is the actual volume of diluent poured into the cup and Fw is the calibrated diluent flow rate of the beverage dispenser.

Next, the computer executes software to calculate the weight of the water poured (mwc) according to the equation:

$$mwc=Vwc/Dw$$

The processor can then calculate the weight of the flavoring dispensed (msc) during the measured dispense time according to the equation:

$$msc=mp-mwc$$

From this calculation of the weight of the flavoring poured, the controller can execute software to calculate a volume of flavoring poured (Vsc) during the measured dispense time according to the equation:

$$Vsc=msc/Ds$$

Finally, an actual diluent-to-flavoring ratio by volume (Rvc) can be calculated according to the equation: Rvc=Vwc/Vsc. This post dispense calculation of the actual diluent-to-flavoring ratio represents an indication of the quality of the dispensed drink.

Next, at 214 the calculated actual diluent-to-flavoring ratio by volume of the dispensed beverage is compared to an optimal diluent-to-flavoring ratio for the ordered beverage. In an exemplary embodiment, the specified optimal diluent-to-flavoring ratio for the ordered beverage may be a specified ratio with a tolerance range or alternatively the optimal ratio may be represented as a range of acceptable ratios. In one embodiment, so long as the calculated actual diluent-to-flavoring ratio is an acceptable ratio in comparison to the optimal ratio or an optimal ratio range, the calculated actual diluent-to-flavoring ratio may be stored by the computer of the beverage dispenser and used in the calculations set forth above for calculating the diluent and flavoring amounts (e.g. weights) to be dispensed in subsequent pours.

After the calculation of the dispensed drink quality and the comparison of the actual ratio to the optimal ratio, at 216 an indication is produced based upon these post-dispense calculations. In one exemplary embodiment, if the calculated actual diluent-to-flavoring ratio is outside of the predetermined range or tolerance for the optimal diluent-to-flavoring ratio for the beverage, an indication or an alarm may be produced for a technician to service the beverage dispenser. In an alternative embodiment, the computer may adjust the operation of the at least one flow valve to either increase or decrease the diluent and/or flavor dispensed when dispensing that beverage.

In still further embodiments, information regarding the volumes of the diluent and/or at least one flavor are provided to an inventory control system to monitor an inventory of the source beverage components used in the beverage dispenser. In non-limiting embodiments, the inventory control system may enable online monitoring of inventory, exemplarily engage simultaneous monitoring of multiple beverage dispensers at multiple locations, or to enable a distributor to monitor inventory levels, for example to provide more efficient and timely deliveries of the component diluents and flavorings.

Figure 8:
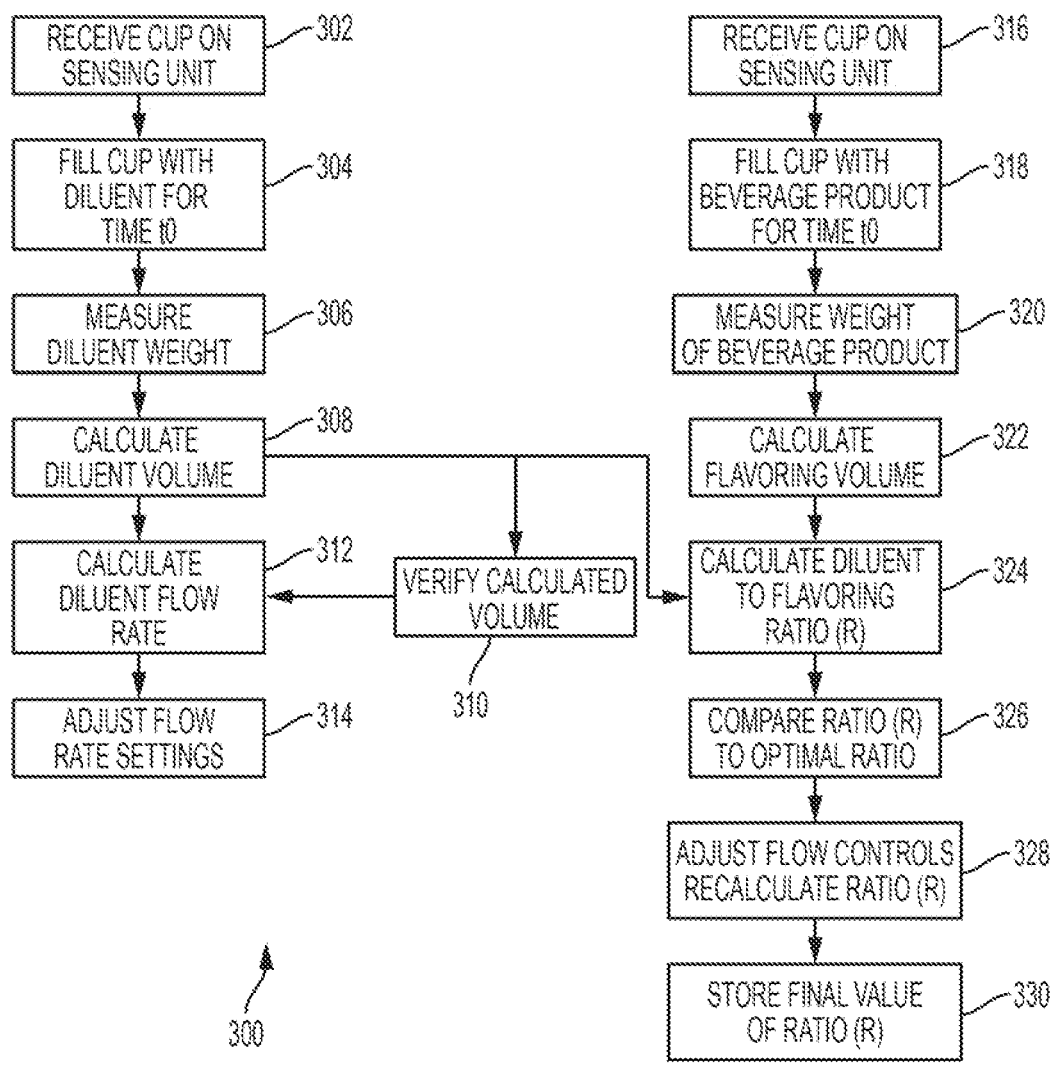
FIG. 8 is a flow chart that depicts an exemplary embodiment of a method of dispensing a beverage with real time component ratio control.

FIG. 8 is a flow chart that depicts an exemplary embodiment of a method 300 of calibrating a beverage dispensing unit. The exemplary embodiment of the method 300 may be carried out as step 202 in the method 200 depicted in FIG. 7.

In exemplary embodiment at least portions of the method 300 may be carried out by the computer of the beverage dispenser executing software stored upon a computer readable medium, the execution of the software causing the computer to execute the processes and functions as disclosed herein. In a still further exemplary embodiment, the software and/or the computer may contain predetermined fixed variables which may be set values or previously calibrated values. These fixed variables, as used in further detail herein may include:

Vc=Cup volume for various sizes (fl.oz)
ViMax=Maximum volume of ice possible to fit in a given cup volume (Vc)
Dw=Diluent density (oz/fl.oz)
Ds=Flavoring density for various flavorings (oz/fl.oz)
Di=Ice Density (oz/fl.oz)
t0=Time to fill cup during calibration
t1, t2 . . . tn=times taken in sequence during a single dispense of a beverage
Rt=target value for diluent-to-flavoring ratio Additionally, a value Fa may represent a force of liquid falling into the cup at the end of the pour. In various embodiments, this force may be different for each size of cup due to the distance the liquid falls from the nozzle to the top of the liquid in the cup. This force (Fa) may either be a calculated value or a calibrated value. If the value is calculated, Fa can be calculated using a value for an initial velocity of the product (Vpl) when it leaves the nozzle of the beverage dispenser with an additional value of the velocity of the liquid and due to falling into the cup due to gravity (Vpg). Exemplarily, $Vpg=(2gh)^{-0.5}$ where g is acceleration due to gravity and h is the known final height of the drink in the full cup. Vpl may exemplarily be calculated as the ratio of the beverage product flow rate and the nozzle cross sectional area. In such an embodiment, the force (Fa) may be calculated: Fa=(Vpl+Vpg)*product flow rate*product density.

If the force (Fa) is a calibrated value, the value may exemplarily be directly measured by an operator by creating a fixture that measures the impact force of the beverage product on the sensing unit only at various heights of the sensing unit while displacing the beverage product away from the sensing unit so that the beverage product does not accumulate at the sensing unit.

In some exemplary embodiments, an instantaneous force (Fx) representative of the liquid falling into the cup at any time during the force may be stored as a calculated or as a calibrated value. If the instantaneous force (Fx) is a calculated value, then the instantaneous force (Fx) can be calculated in the same manner in which Fa is calculated, although the product flow rate may be directly measured and/or calculated and/or a combination of the two and therefore known at any given time such that the initial product velocity is known throughout the duration of the pour. In an exemplary embodiment, the height (h) of the beverage product in the cup will always be increasing and can be calculated based upon the flow rate or beverage amount measured by the sensing unit and known dimensions of the selected cup throughout the duration of the pour.

Referring back to a method 300 depicted at FIG. 8, various combinations of the steps as set forth in the method 300 can be used to achieve an adjustment of flow rate settings of the dispenser and/or to adjust a calculated diluent-to-flavoring ratio by volume for a particular beverage dispense by the beverage dispenser. It will understood that in exemplary embodiments, an operator may initiate and/or carry out embodiments of the method 300 in conjunction with the beverage dispenser, exemplarily through interaction with the graphical display, exemplarily as a touch-sensitive graphical display. In some embodiments of the method 300, the beverage dispenser operates to calculate and recommend adjustments which may be physically carried out by an operator or technician of the beverage dispenser, while in other embodiments, the adjustments may be carried out automatedly by the beverage dispenser itself.

At 302 a cup is received on the sensing unit. In an exemplary embodiment, the cuff is of a known volume and dimensions and the sensing unit is located under a dispensing nozzle of the beverage dispenser. At 304, the beverage dispenser is operated to fill the cup with diluent for a time t0. Through the use of the sensing unit, a controller of the beverage dispenser measures the diluent weight at 306 and the diluent weight is used in conjunction with a density of the diluent to calculate a volume of the dispensed diluent at 308. In some embodiments, the calculated diluent volume may be verified at 310 before the method 300 proceeds. In an exemplary embodiment, the calculated diluent volume can be verified by an operator manually investigating the cup filled with the diluent to compare graduations of the cups to the calculated diluent volume. In an exemplary embodiment, the graphical display may prompt the operator for an input confirming that the calculated volume has been verified.

At 312, the calculated diluent volume is used to calculate the flow rate over the dispense time t0. After the diluent flow rate has been calculated, this flow rate can be used at 314 to adjust diluent flow rate settings in the beverage dispenser. In an exemplary embodiment of the beverage dispenser wherein the diluent flow rate is a stored variable, the calculated diluent flow rate from 312 is stored in the computer readable memory for use by the controller. In an embodiment wherein a flow meter is used in conjunction with the diluent source to measure the flow of diluent as it is dispensed, software executed by the controller may operate to associate the output parameters of the flow meter collected by the computer to the calculated diluent flow rate. In an exemplary embodiment, the output of the flow meter collected by the controller may be a pulse frequency, a pulse duty cycle, or a paddle RPM dependent upon the flow meter used. If the response of a flow meter is known, the software can extrapolate the instantaneous flow rate over the entire flow meter output parameter range to calibrate the diluent flow rates during dispense to the output parameters collected from the flow meter. In some exemplary embodiments, additional calibrations may be performed by repeating one or more steps as described above with varying flow rates to compensate for response curve variances between different flow meters, if necessary. Recent flow rate and associated output parameters of the flow meter can be used to characterize flow rate versus flow meter output parameters over an entire flow meter output parameter range.

The method 300 further includes steps to result in an adjustment of the diluent-to-flavoring ratio for a particular dispensed beverage.

At 306 a cup is received on the sensing unit. As described above, the cup may exemplarily be of a known volume and dimensions. At 318 the beverage dispenser is operated to fill the cup with a specified beverage product (e.g. including at least one diluent and at least one flavoring) for a time t0. At 320 the weight of the dispensed beverage is measured, exemplarily by the controller receiving at least one signal from the sensing unit.

From the measured weight of the dispensed beverage a dispensed flavoring volume is calculated at 322. The dispensed flavoring volume can exemplarily be calculated by subtracting a calculated weight of the diluent from the dispensed beverage for example as a function of the dispense time t0, diluent flow rate, and density of the diluent. This diluent weight may be subtracted from the weight of the beverage product measured at 320 to arrive at a weight of the dispensed flavoring. The weight of the dispensed flavoring can be used to calculate a volume of the dispensed flavoring using a density of the flavoring.

Once the volume of the dispensed flavoring is calculated at 322, the diluent-to-flavoring ratio (R) by volume can be calculated at 324 using information regarding the volume of the base dispensed diluent. This may already be known in embodiments wherein the diluent flow rates have been calibrated as described above and t0 is the same between the calibration procedures. This may also be known in embodiments wherein the diluent flow rate is measured directly during the dispense.

At 326 the calculated diluent-to-flavoring ratio (R) is compared to an optimal diluent-to-flavoring ratio for the selected beverage product. Based upon the comparison at 326, adjustments to the flow controls of the flavoring may be made as necessary. In an exemplary embodiment, this may include an operator adjustment of flavoring flow controls, while in another embodiment, the adjustment to the flavoring flow controls may be carried out by the controller in an error minimizing routine. In embodiments, previous steps as identified above may be repeated until the calculated diluent-to-flavoring ratio is within an acceptable range within the predetermined optimal diluent-to-flavoring ratio for the beverage product. At that time a final value of the diluent-to-flavoring ratio achieved by the beverage dispensing unit is stored at 330.

Figure 9:
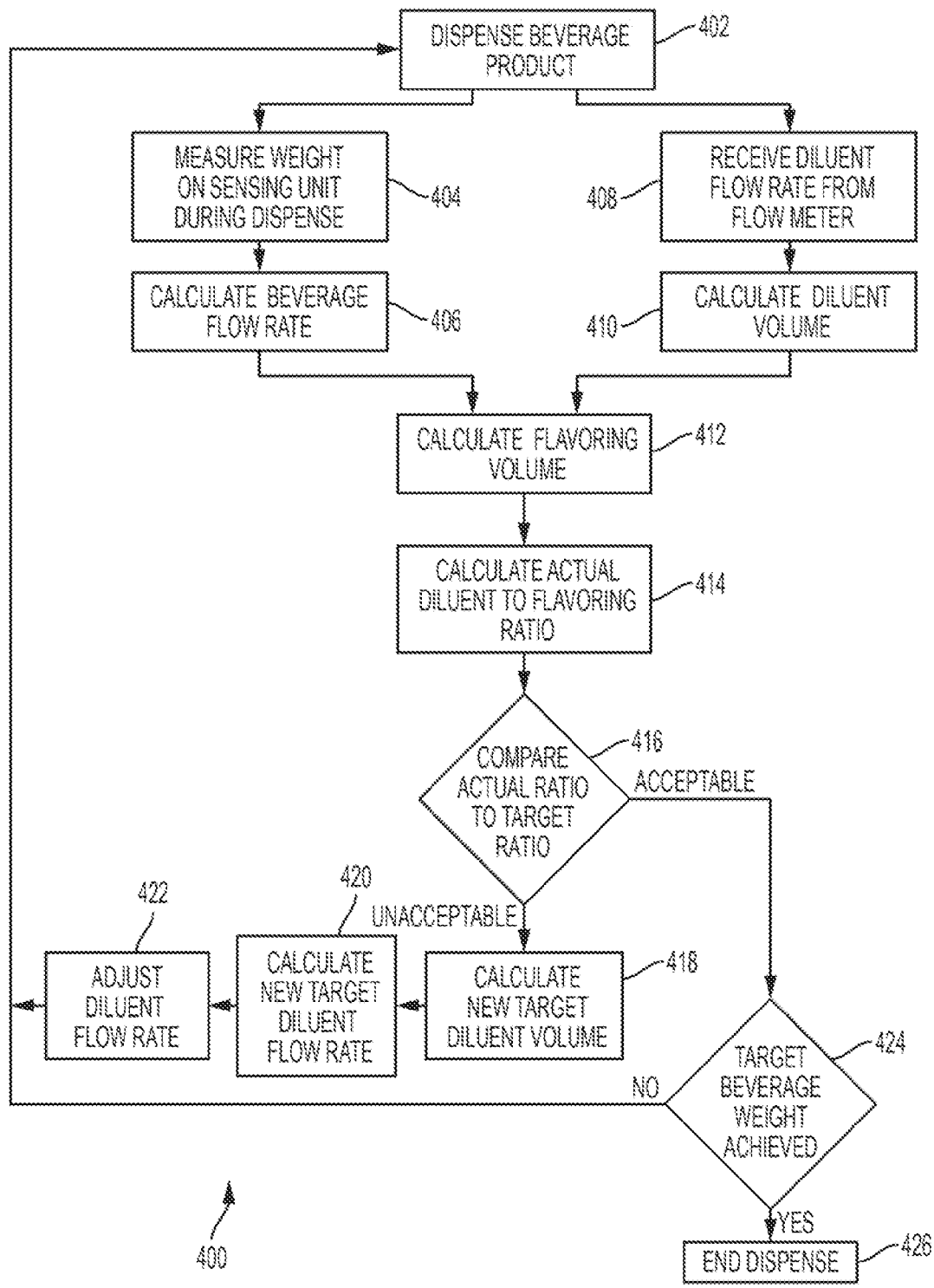
FIG. 9 is a flow chart that depicts an exemplary embodiment of a method of dispensing a beverage.

FIG. 9 is a flow chart that depicts an exemplary embodiment of a method of dispensing a beverage product 400 with automated intra-dispense adjustment of diluent-to-flavoring ratio. In an exemplary embodiment, the method 400 may be carried out in achieving the step 210 of dispensing product as described above with respect to the method 200 and FIG. 7. In a further exemplary embodiment, the diluent may exemplarily be carbonated water and the flavoring exemplarily by beverage syrup in a post-mix beverage dispense. Exemplary embodiments of the method 400 may be carried out in real-time while other embodiments may occur at longer intervals while still occurring at a frequency to achieve intra-dispense adjustment as described herein. In an exemplary embodiment, the beverage dispensing unit includes both a sensing unit as described above as well as at least one flow sensor associated with the diluent.

At 402 the beverage dispenser begins to dispense an ordered beverage product, exemplarily as described above at a previously determined diluent flow rate and flavoring flow rate to achieve the desired diluent-to-flavoring ratio for the ordered beverage product.

As the beverage is dispensed, the weight of the dispensed beverage is sensed at 404 by the sensing unit as described above. Exemplarily, the weight on the sensing unit may be measured at a series of periodic time intervals (e.g. t1, t2) and a value from the sensing unit registered at each time increment. At 406 a beverage flow rate is calculated from these measured values and time intervals, exemplarily using the equation:

$$Fmp = (m2-m1)/(t2-t1)$$

wherein Fmp is the mass flow rate and m1 is the value of the sensing unit obtained at time t1 and m2 is the value of the sensing unit obtained at time t2.

Also during the dispense of the beverage a diluent flow rate is received by the controller at 408 from the flow meter associated with the diluent source. In non-limiting embodiments, this diluent flow rate may exemplarily be an instantaneous flow rate obtained at times t1 and t2 or may be an average or integrated flow rate between times t1 and t2 as measured by the flow meter.

At 410 a volume of the diluent dispensed between times t1 and t2 is calculated. This may exemplary be calculated using the equation:

$$Vwc = Fw2*(t2-t1)$$

wherein Fw2 is the flow rate of the diluent from the flow meter and Vwc is the calculated volume of the dispensed diluent.

Next, at 412 a volume of flavoring dispensed between times t1 and t2 is calculated. Exemplarily, a weight of the diluent dispensed between times t1 and t2 is calculated using the calculated dispense diluent volume and a known density of the diluent. This diluent weight is subtracted from the measured dispensed beverage weight from 404 to arrive at a dispensed flavoring weight. The controller of the beverage dispenser may then convert this flavoring weight to a volume of dispensed flavoring using a known density of the flavoring.

At 414 the calculated diluent volume from 410 and the calculated flavoring volume from 412 are used to calculate an actual diluent-to-flavoring ratio during the beverage dispense between times t1 and t2. This calculated actual diluent-to-flavoring ratio is compared at 416 to a target diluent-to-flavoring ratio for the ordered beverage product.

If the calculated actual diluent-to-flavoring ratio is outside of an acceptable range from the target diluent-to-flavoring ratio, then at 418 a new target diluent volume is calculated. The new target diluent volume (Vwcn) may exemplarily be calculated by:

$$Vwcn = Rt*vsc$$

A new target diluent flow rate is calculated at 420 from this new target water volume. The new target diluent flow rate (Fw3) can exemplarily be calculated by:

$$Fw3 = Vwcn/(t3-t2)$$

Software executed by the controller may cause the controller to send instructions to one or more components of the beverage dispenser, exemplarily one or more flow valves associated with the dispense of the beverage components, and exemplarily at least one flow valve associated with the dispense of the diluent to adjust the diluent flow to achieve the new target diluent flow rate Fw3 over the time period between t2 and t3. In an exemplary embodiment, this may be executed by control signals sent from the computer to electronic portion control valves, exemplarily through pulse with modulation (Pwm) of valve open and close times or by other manners of flow control as will be recognized by a person of ordinary skill in the art. The method continues to dispense the beverage at the new diluent flow rate until the calculated actual diluent-to-flavoring ratio is within an acceptable range of the target diluent-to-flavoring ratio at

416. When the ratio is acceptable, the method exemplarily continues until the target beverage weight associated with the ordered size and type of beverage product is achieved at 424. When this target weight is achieved, the beverage dispensing unit ends the dispense of the beverage.

In additional exemplary embodiments, the computer may execute software that continuously calculates the instantaneous force of the liquid falling into the cup (Fx) as described above and subtracts this impact force from the measured weight on the sensing unit during the dispense in order to obtain a more accurate actual instantaneous measurement of weight impressed upon the sensing unit by the cup, ice, and beverage at any point in time during the dispense.

In still further additional exemplary embodiments, the controller may execute software to check and/or verify a final weight of the dispensed beverage after the flow of beverage through the nozzle has stopped. This final check and/or verification may additionally rule out the aforementioned impact force contribution to the measured weight of the dispensed beverage any dispense and additional beverage volume as may be needed. In an alternative embodiment, the target beverage weight sought at 424 may exemplarily be compensated by an amount of the force of the beverage falling into the cup at the end of the pour (Fa) as described above.

Various exemplary embodiments of the systems, apparatus, and methods as disclosed herein may operate to achieve beverage dispensing units with improved calculation of diluent-to-flavoring ratio. This improved calculation of diluent-to-flavoring ratio and can be used to evaluate dispense beverage products for product quality and initiate indications or other actions in the event of a dispense of a low quality beverage product. Some embodiments as disclosed herein may achieve improved dispense of beverages with intra-dispense adjustment of the diluent-to-flavoring ratio. Still further embodiments as disclosed herein provides beverage dispensing units with improved inventory tracking.

Some exemplary embodiments as disclosed herein achieve a reduced error when calibrating or adjusting a beverage dispensing unit using a brix cup or achieve simplified operator process and reduced need for operator to transport external equipment to perform a dispenser ratio set up or calibration. Still further exemplary embodiments as disclosed herein eliminate errors in miscalculating diluent-to-flavoring ratio volume as such calculations are formed by the computer in the beverage dispensing unit.

Embodiments of the beverage dispensing unit as disclosed herein may further provide autofill features without the need for the consumer beverage cup to touch a lever or other device to monitor a liquid level dispensed into the consumer beverage cup and to shut off the dispenser.

In the present Description, certain terms have been used for brevity, clearness and understanding. No unnecessary limitations are to be implied therefrom beyond the requirement of the prior art because such terms are used for descriptive purposes only and are intended to be broadly construed. The different embodiments described herein may be used alone or in combination with other apparatuses, systems and methods. Various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A beverage dispensing system for dispensing a beverage into a container, the system comprising:
   a diluent source comprising a diluent;
   a flavoring source comprising a flavoring;
   a dispenser nozzle that is configured to dispense into the container a beverage comprising a mixture of the diluent and the flavoring in an actual diluent-to-flavoring ratio;
   a sensing unit that is configured to measure a load impressed upon the sensing unit by the container, any ice in the container, and any beverage in the container; and
   a controller that calculates the actual diluent-to-flavoring ratio based upon the load.

2. The system according to claim 1, wherein the controller is further configured to compare the actual diluent-to-flavoring ratio to a threshold, and further wherein the controller produces an alert when the actual diluent-to-flavoring ratio is outside of the threshold, the threshold representative of a predetermined optimal diluent-to-flavoring ratio for the beverage.

3. The system according to claim 1, wherein the controller is further configured to calculate an actual volume of ice in the container based upon a known volume of the container and the load measured by the sensing unit of the container and any ice in the container.

4. The system according to claim 3, wherein the controller is further configured to calculate an actual volume of beverage required to fill the container based upon the known volume of the container and the actual volume of ice in the container.

5. The system according to claim 4, wherein the controller is further configured to calculate an actual amount of diluent and an actual amount of flavoring needed to fill the container based upon the actual volume of beverage required to fill the container an optimal diluent-to-flavoring ratio of the beverage.

6. The system according to claim 5, wherein the controller is further configured to calculate a total amount of beverage product needed to fill the container based upon the actual amount of diluent and the actual amount of flavoring needed to fill the container.

7. The system according to claim 6, further comprising at least one flow valve associated with the diluent source and the flavoring source, wherein the controller is further configured to operate the at least one flow valve to dispense the beverage to the container via the dispenser nozzle, and to monitor an actual amount of beverage product in the container as the beverage product is dispensed based upon the load measured by the sensing unit, and to thereafter control the at least one flow valve to stop dispensing the beverage to the container when the actual amount of beverage in the container reaches a target amount that is stored in the memory.

8. The system according to claim 7, wherein the controller is further configured to calculate the actual diluent-to-flavoring ratio of the beverage in the container based upon the measured actual amount of beverage product dispensed into the container, and a calculated volume of diluent dispensed into the container.

9. The system according to claim 8, wherein the controller is further configured to compare the actual diluent-to-flavoring ratio of the beverage to a threshold and to control an output device to alert an operator if the actual diluent-to-flavoring ratio of the beverage is outside of the threshold.

10. The system according to claim 1, further comprising a flow meter that is configured to sense an actual flow rate of the diluent dispensed from the dispenser nozzle, wherein the controller is configured to calculate the actual dispensed volume of the diluent and to calculate an actual diluent-to-flavoring ratio based upon the load measured by the sensing unit of the beverage dispenser and calculated actual volume of the diluent.

11. The system according to claim 1, wherein the sensing unit comprises a scale and the load impressed upon the sensing unit is a weight of the container, any ice in the container, and any beverage in the container, the sensing unit comprises a cover housing configured to support the container, and the sensing unit comprises at least one spring that balances the cover housing at a position above the scale.

12. The system according to claim 11, wherein the scale comprises a strain gauge plate and a strain gauge connected to the strain gauge plate such that the strain gauge plate deflects when the container is placed on the scale.

\* \* \* \* \*